106-93 CROSS REFERENCE EXAMINER

Patented Oct. 9, 1951

2,570,827

UNITED STATES PATENT OFFICE 2,570,827

COMPOSITION FOR WATERPROOFING MASONRY

Ralph Eugene Madison and Frederic Arthur Fairbrother, Jr., Detroit, Mich., assignors to Devoe & Raynolds Company, Inc., New York, N. Y., a corporation of New York No Drawing. Application July 1, 1948, Serial No. 36,416

14 Claims. (Cl. 106—193)

This invention relates to the waterproofing of Portland cement concrete and general masonry construction and particularly to improved compositions for rendering such types of construction impermeable to water.

Portland cement concrete and mortar are mixed before use with water in excess of that required for the normal processes of hardening and setting. This excess water is evenly distributed throughout the mass of concrete or mortar and as it evaporates leaves unoccupied space in the form of fine capillary pores. It is the natural capillarity of this porous structure that influences the absorption and permeation of water into Portland cement concrete and mortar.

Heretofore various methods have been used to treat concrete mortar and masonry in buildings and engineering structures to prevent penetration of moisture. Through the years experience has demonstrated that one of the most effective processes is the so-called "Iron type of waterproofing," which employs iron that is in a finely divided state capable of oxidation.

In this process the finely divided iron is mixed with approximately 5% by weight of ammonium chloride and sufficient water added to form a slurry, which is applied by brushing. The iron particles are drawn into the pores of the masonry surface through the wetting action of the water in which they are suspended and the mechanical force of brushing, and through the natural and normal process of oxidation are changed to a hydrated oxide with a corresponding increase in molecular volume.

The use of this composition, however, is attended with practical difficulties due to the tendency of the dense particles of iron to settle to the bottom of the container in which they are mixed with water. On account of this precipitous settling it is necessary to continuously stir the mixture during application, and brush it on quickly. Even so, several applications are necessary to develop a satisfactory film.

The several objects of this invention therefore are:

a. To improve physical suspension of the fine particles of iron in the water.

b. To increase the thickness of the waterproof coating and to provide a more uniform, continuous film per application.

c. To provide a waterproofing composition that is easy to brush.

d. To obtain more rapid and complete oxidation of the iron.

These objects are accomplished by incorporating in the waterproofing composition, three ingredients, (A) a finely divided iron, (B) an inorganic salt, and (C) a water soluble cellulose ether. The nature of these three ingredients is more fully disclosed below.

(A) IRON

The composition of this invention contains iron of a particle size that is freely drawn into the pores of the surface by water penetration, and then through oxidation increases in molecular volume to further seal and waterproof the surface by forming a continuous oxidized film.

In the practice of this invention we find it advantageous to use a mixture of "100" iron and "200" iron where "100" iron is a crushed iron having the following screen analysis:

| | Per cent |
|---|---|
| Held on 80 mesh | 1 |
| Held on 100 mesh | 5 |
| Held on 200 mesh | 70 |
| Through 200 mesh | 24 | and, "200" iron is a powdered iron having the following screen analysis:

| | Per cent |
|---|---|
| Held on 200 mesh | 1 |
| Through 200 mesh | 99 |

It is a part of our discovery that a mixture of "100" iron and "200" iron is better than either type alone. If "100" iron is substituted for all of the "200" iron, the resulting composition is difficult to keep in suspension and oxidizes slowly. On the other hand if all "200" iron is used, the suspension is improved at the expense of adhesion and oxidation.

(B) ELECTROLYTE

A number of compounds may be successfully used to accelerate the oxidation of the iron particles. It is known for example that good results can be obtained by using manganese dioxide, sulfur, iron sulfide, or ammonium alum for this purpose. It is particularly advantageous however to use ammonium chloride for most rapid and complete reaction.

The proportion of inorganic electrolyte used in our product is not critical and may be varied somewhat depending upon the salt used. Best results were obtained when we used between 1¾% and 7¼% ammonium chloride based on the weight of iron. If less than 1¾% sal ammoniac is used the oxidation is proportionately incomplete. Likewise, if the content of sal ammoniac exceeds 7¼% the oxidation is deficient and the adhesion of the coating is definitely impaired. It is particularly advantageous to use 5% ammonium chloride which amount shows the most impressive and pronounced results. Approximately 5% ammonium alum will also give very good results under certain conditions to be described hereinunder.

(C) WATER SOLUBLE CELLULOSE ETHER

The water soluble cellulose ethers which we have found to be most satisfactory in the practice of this invention are methyl cellulose, hydroxy ethyl cellulose and sodium carboxy methyl cellulose. These cellulose ethers may be obtained in different grades and viscosities and the amount added will vary according to the viscosity of the particular product used. This viscosity variation in centipoises, is illustrated in Table I which presents data on 2% aqueous solutions.

Table I

Hydroxy ethyl cellulose:                     Cps.
    Low viscosity _____     5
    Medium viscosity _____    55
    High viscosity _____    75
Methyl cellulose:
    Low viscosity _____    50
    Medium viscosity _____  1500
    High viscosity _____  4000
Sodium carboxy methyl cellulose:
    Low viscosity _____    16
    Medium viscosity _____   300
    High viscosity _____  1000

We have found that the viscosity of methyl cellulose and sodium carboxy methyl cellulose solutions is diminished by the addition of ammonium alum and for this reason prefer to use sal ammoniac in combination with these particular cellulose derivatives. Hydroxy ethyl cellulose may be used to equal advantage with either electrolyte.

The amount of cellulose ether employed in our composition may vary from approximately 1% to 3%, by weight, and will vary with the viscosity and the particular product used. Thus approximately 1% by weight of methyl cellulose is sufficient, and as little as 0.2% of a high viscosity methyl cellulose will improve the iron suspension of our composition. It is well to use somewhat more hydroxy ethyl cellulose, usually from 1% to 3%. Here again however the exact amount will depend on the viscosity of the product used. Contrary to our expectations we have found that the presence of cellulose ethers in this concentration does not limit to any appreciable extent the desired penetration of the composition into concrete or other surfaces to which it is applied.

The amount of water that will be required to obtain a brushable composition is also related to the viscosity and type of cellulose ether present. The weight of water required to reduce a composition containing 1000 parts by weight of iron, 50 parts by weight electrolyte and a cellulose ether to brushable consistency is shown in Table II.

Table II

| Cellulose Ether | Percentage | Parts Water to give brushable consistency |
|---|---|---|
| 4000 cps. Methyl Cellulose | 1 | 300.0 |
| 1500 cps. Methyl Cellulose | 1 | 212.5 |
| 50 cps. Methyl Cellulose | 1 | 195.0 |
| 5 cps. Hydroxy Ethyl Cellulose | 1 | 145.0 |
| Do | 3 | 212.5 |
| 9 cps. Hydroxy Ethyl Cellulose | 1 | 160.0 |
| 55 cps. Hydroxy Ethyl Cellulose | 1 | 192.5 |
| Do | 3 | 300.0 |
| 75 cps. Hydroxy Ethyl Cellulose | 1 | 217.5 |
| 16 cps. Sodium Carboxy Methyl Cellulose | 1 | 222.5 |
| 300 cps. Sodium Carboxy Methyl Cellulose | 1 | 320.0 |
| 1000 cps. Sodium Carboxy Methyl Cellulose | 1 | 335.0 |
| 16 cps. Sodium Carboxy Methyl Cellulose | 3 | 460.0 |
| 1000 cps. Sodium Carboxy Methyl Cellulose | 3 | (1) |

[1] Altogether too much water needed.

In addition to improving the brushing characteristics of this composition, the cellulose ethers have another advantage in that they promote a more rapid oxidation. This may be illustrated by preparing an iron sal ammoniac composition with and without hydroxy ethyl cellulose. If these two formulations are applied to cinder blocks and each treatment given one application of water, the sample containing the hydroxy ethyl cellulose will show considerably faster oxidation. We have found that hydroxy ethyl cellulose has a pH range of 5.5 to 6.5 and believe that this acid reaction is responsible for the results observed. This rapid oxidation will also take place when the hydroxy ethyl cellulose is used with iron in the absence of sal ammoniac.

The following examples of specific compositions are intended to be illustrative only. It will be understood that other satisfactory formulations may be prepared by following the principles disclosed above.

EXAMPLE I

Parts
"100" iron _____ 50
"200" iron _____ 50
Ammonium alum _____  5
Hydroxy ethyl cellulose (55 cps.) _____  3

Approximately 300 parts of water are added to 1000 parts of the dry mix of Example I to obtain a product of brushable consistency.

EXAMPLE II

Parts
"100" iron _____ 50
"200" iron _____ 50
Sal ammoniac _____  5
Methyl cellulose (4000 cps.) _____  1

In applying the above composition from 300 to 400 parts by weight of water should be added to 1000 parts of the dry mix.

A product that utilizes sodium carboxy methyl cellulose to improve oxidation and give homogeneous suspension is set forth in Example III.

EXAMPLE III

Parts
"100" iron _____ 40
"200" iron _____ 60
Sal ammoniac _____  5
Medium viscosity sodium carboxy methyl
    cellulose _____  1

1000 parts of Example III should be mixed with approximately 320 parts of water before use.

The above description and examples are intended to be illustrative only. Any modification thereof or variation which conforms to the spirit of the invention is intended to be included within the scope of the claims.

We claim:

1. A composition of matter consisting essentially of particles of finely-divided iron capable of undergoing oxidation, from about 1¾% to about 7¼%, by weight, of an ammonium derivative selected from the class consisting of ammonium chloride and ammonium alum, and from about 1% to about 3%, by weight, of a water-soluble cellulose ether selected from the class consisting of methyl cellulose, hydroxy ethyl cellulose and sodium carboxy methyl cellulose, said composition being in the form of a dry mixture and forming a waterproof coating when mixed with water and applied to a porous concrete surface.

2. A composition of matter as defined in claim 1 in which the water-soluble cellulose ether is hydroxy ethyl cellulose.

3. A composition of matter as defined in claim 1 in which the water-soluble cellulose ether is sodium carboxy methyl cellulose.

4. A composition of matter as defined in claim 1 in which the ammonium derivative is ammonium chloride.

5. A composition of matter as defined in claim 1 in which the ammonium derivative is ammonium alum.

6. A composition of matter as defined in claim 1 in which the greater proportion of the particles of the finely-divided iron is of a size to pass through a 200-mesh screen and a substantial portion is of a size to pass through a 100-mesh screen and to be held on a 200-mesh screen.

7. A composition of matter as defined in claim 1 in which the ammonium derivative is ammonium chloride and the water-soluble cellulose ether is sodium carboxy methyl cellulose.

8. A composition of matter as defined in claim 1 in which the ammonium derivative is ammonium chloride and the water-soluble cellulose ether is hydroxy ethyl cellulose.

9. A composition of matter as defined in claim 1 in which the ammonium derivative is ammonium alum and the water-soluble cellulose ether is hydroxy ethyl cellulose.

10. A composition of matter as defined in claim 1 in which the ammonium derivative is ammonium chloride and is present in amount of about 5% and the water-soluble cellulose ether is sodium carboxy methyl cellulose and is present in amount of about 1%.

11. A composition of matter as defined in claim 1 in which the ammonium derivative is ammonium alum and is present in amount of about 5% and the water-soluble cellulose ether is hydroxy ethyl cellulose and is present in amount of about 1%.

12. A composition of matter consisting essentially of particles of finely-divided iron capable of undergoing oxidation, from about 1¾% to about 7¼%, by weight, of an ammonium derivative selected from the class consisting of ammonium chloride and ammonium alum, and from about 0.2% to about 3% of methyl cellulose, said composition being in the form of a dry mixture and forming a waterproof coating when mixed with water and applied to a porous concrete surface.

13. A composition of matter as defined in claim 12 in which the ammonium derivative is ammonium chloride.

14. A composition of matter as defined in claim 12 in which the ammonium derivative is ammonium chloride and is present in amount of about 5% and the methyl cellulose is present in amount of about 1%.

RALPH EUGENE MADISON.
FREDERIC ARTHUR FAIRBROTHER, JR.

REFERENCES CITED

The following references are of record in the file of this patent:

UNITED STATES PATENTS

| Number | Name | Date |
|---|---|---|
| 1,825,199 | Patino | Sept. 29, 1931 |
| 2,018,343 | Bienfait | Oct. 22, 1935 |
| 2,026,475 | Larmore | Dec. 31, 1935 |
| 2,316,745 | Robertson et al. | Apr. 13, 1943 |
| 2,336,636 | Peterson | Dec. 14, 1943 |
| 2,346,624 | Straus | Apr. 11, 1944 |